April 17, 1934.　　F. J. GOUGH ET AL　　1,955,123
FOAM CELL
Filed April 25, 1930　　2 Sheets-Sheet 2
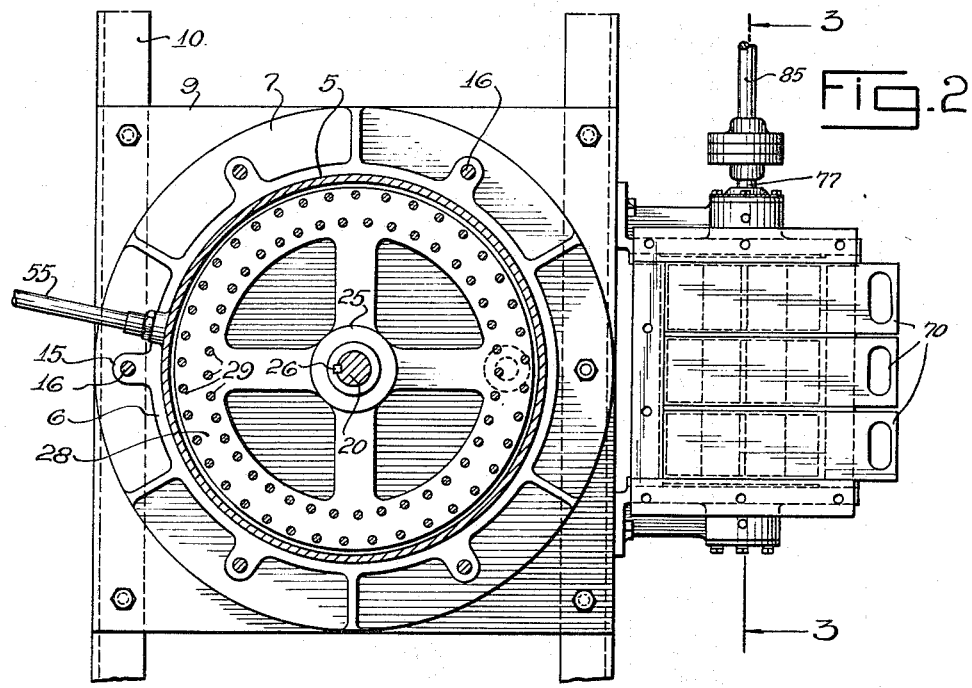
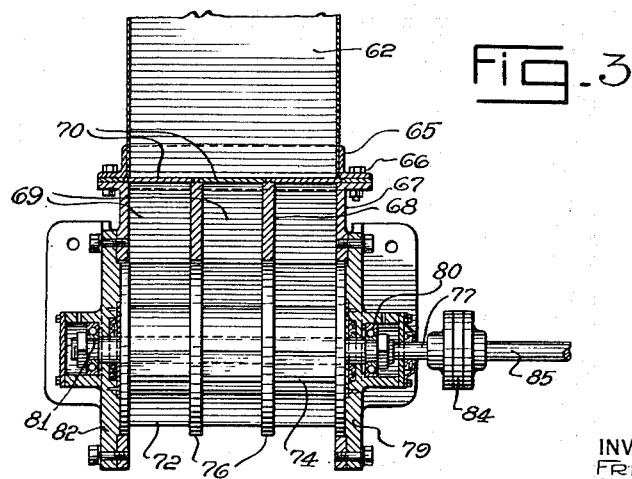
INVENTOR
FRED J. GOUGH.
BERNARD T. BALLARD.
BY
ATTORNEY Patented Apr. 17, 1934

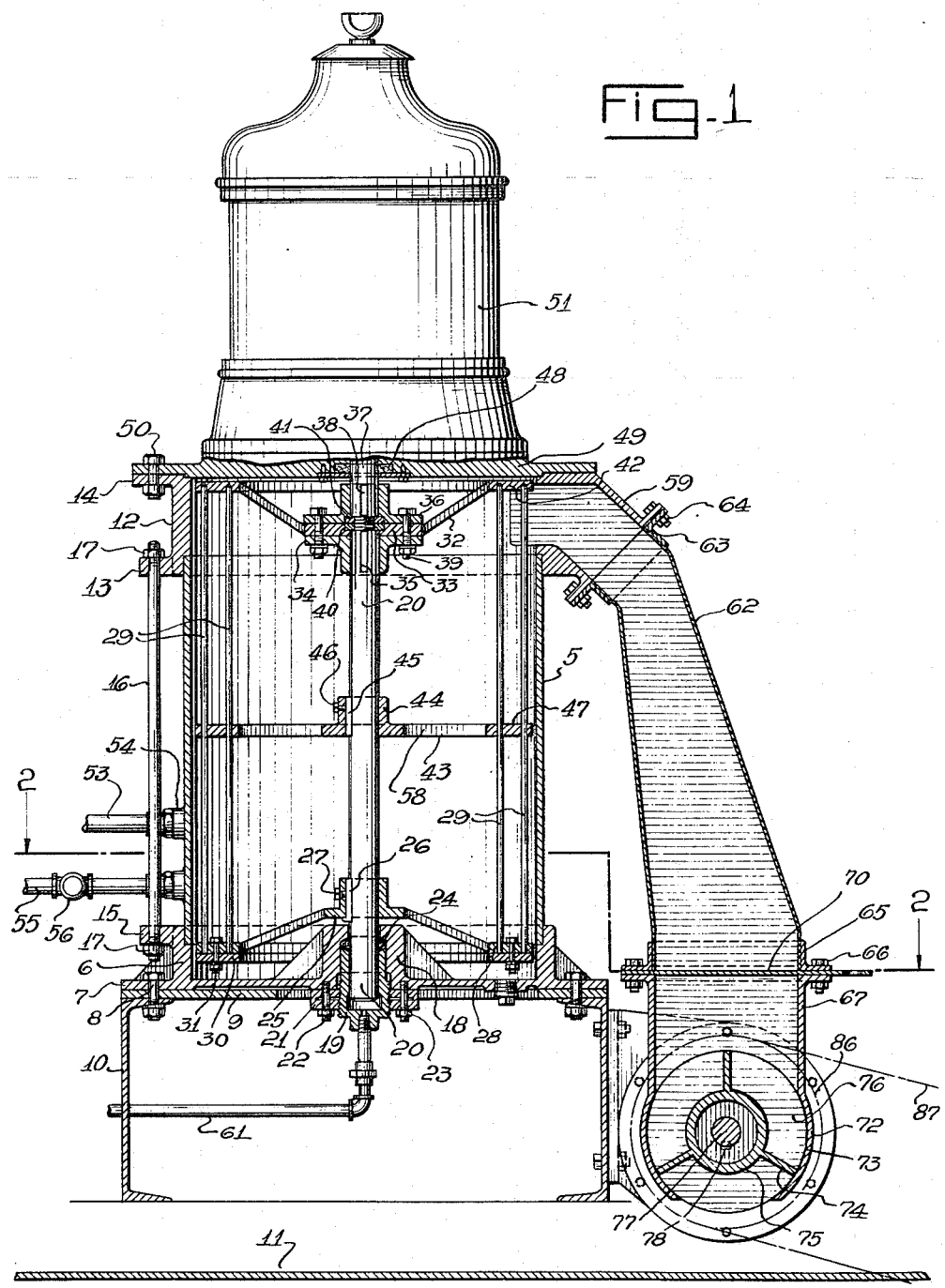

1,955,123

UNITED STATES PATENT OFFICE 1,955,123

FOAM CELL

Fred J. Gough and Bernard T. Ballard, Fort Dodge, Iowa, assignors to United States Gypsum Company, Chicago, Ill., a corporation of Illinois Application April 25, 1930, Serial No. 447,138

11 Claims. (Cl. 261—93)

This invention relates to means for the production of foam and has reference more particularly to an apparatus for the manufacture of light weight foam, the latter usually being used for mixing with plastic substances, such as gypsum stucco, in the manufacture of gypsum boards, blocks, tiles, etc.

In the mixture of light weight foams with stucco and water, or other plastic materials, it is desirable that a continuous, uniform flow of the foam to the plastic material on the mixing belt be obtained so that the percentage of foam added to the plastic material remains constant. Rigidity and proper lubrication of moving parts is also an important consideration.

An object of this invention, therefore, is to provide a foam cell having a uniform delivery of the foam to the plastic material at all times, whereby the flow of foam may be regulated so as to maintain a continuous, even spread of foam along the mixing belt; also to improve foam producing apparatus in other respects hereinafter specified and claimed.

Reference is to be had to the accompanying drawings forming a part of this specification, in which Fig. 1 is a central, sectional elevation through the foam cell, Fig. 2 is a sectional view through the foam cell taken on the line 2—2 of Fig. 1, and Fig. 3 is a sectional view through the foam feeding device taken on the line 3—3 of Fig. 2.

Our foam cell is preferably in the form of a cylindrical casing 5 positioned with its axis substantially vertical. The bottom of said casing is seated in a cast base 6 having an outstanding annular flange 7 fastened by bolts 8 to a base 9 and to beams 10, the latter being mounted directly over a mixing belt 11 which carries the plastic material.

The upper end of the cylindrical casing 5 is seated in annular casing head 12, and outstanding annular flanges 13 and 14 are formed on said cylinder head. An outstanding annular flange 15 is formed on the base 6, and long bolts 16 pass through flanges 13 and 15, being provided with nuts 17 which serve to tightly compress the head and base onto the ends of cylinder 5 and make liquid tight joints. A bearing 18 is formed centrally in the base 6, and a bearing gland 19 encloses the lower end of a rotor shaft 20. An adjusting flange 21 is screwed onto the lower end of gland 19, and stud bolts 22 pass through said flange 21 and are screwed into the bearing 18. The bearing gland 19 is screwed up to tightly compress the flexible packing material 24 about the shaft 20. Nuts 23 are provided on said stud bolts 22 to compress the split adjusting flange 21 and retain the bearing gland 19 in a rigid position.

The shaft 20 serves to support a rotor for whipping foam solution into a foam. This rotor consists of a lower spider 25 secured near the lower end of shaft 20 by means of a key 26 and a set bolt 27. This spider 25 has an outer ring 28 which is provided preferably with two annular series of holes for receiving the lower ends of whipping rods 29. The lower ends of rods 29 are retained in position in the ring 28 by means of a ring 30 abutting the lower ends of said rods 29, said ring 30 being secured to the ring 28 by means of bolts 31.

An upper spider 32 is also provided for supporting the upper ends of the whipping rods 29. This spider 32 is provided with a central hub 33 which is firmly secured between a flange 34 secured to the upper end of shaft 20 by a key 35, and a flange 36 secured to the lower end of a motor shaft 37 by a key 38. Bolts 39 serve to connect the hub 33 to the two flanges 34 and 36. The key 35 extends a short distance into the hub 33 to aid the bolts 39 in insuring that the hub 33 and flanges 34 rotate in unison. The upper end of shaft 20 is provided with a washer 40 screwed onto a threaded section on said shaft, and the lower end of motor shaft 37 is provided with a washer 41 screwed onto a threaded section on said shaft 37. The two washers 40 and 41 are held firmly in face to face contact between the flange 36 and the hub 33, this construction giving a highly rigid connection between the motor shaft 37 and the rotor shaft 20.

The spider 32 is provided with an outer integral ring 42 which is provided with two annular series of holes extending part-way through said ring and receiving the upper ends of rods 29. An intermediate spider 43 is provided with a central hub 44 secured to the shaft 20 by means of a key 45 and set bolt 46. This spider 43 is provided with an outer ring 47 having two annular series of holes adapted to receive the rods 29, and prevents said rods from bending outwardly due to the rapid rotation of the rotor on the shaft 20. The motor shaft 37 passes upwardly through a felt seal 48 formed in a motor base 49, the latter being secured to outstanding flange 14 by means of bolts 50. A suitable electric motor 51 is supported upon the base 49, this motor serving to cause the rapid rotation of the rotor in cylinder 5 and the whipping of the foam solution into foam.

The solution to be whipped into foam is introduced through a pipe 53 from any suitable source of supply, said pipe being secured to an inlet nipple 54 preferably connected to the cylinder 5 at a point between the spiders 25 and 43. As the foam solution flows into the cylinder 5, it immediately encounters the rapidly rotating rods 29 which serve to whip the solution into a foam. In order to aid in the production of the foam, compressed air is introduced into the cylinder 5 through a pipe 55, the latter being provided with a needle valve 56 for accurately controlling the quantity of air introduced into said cylinder 5. It will be noted that the solution pipe 53 and air pipe 55 are close together so that an intimate mixture of the air and foam solution is obtained by the whipping rods 29. The foam produced passes upwardly through openings 58 in the spider 43, and this foam must necessarily be subjected to another whipping action before passing out of the cylinder 5 through an outlet spout 59 formed on the cylinder head 12. This last whipping action insures that all particles of foam solution are converted into foam before leaving the foam cell. In order to lubricate the bearing gland 19, an oil pipe 61 is screwed into the lower end of gland 19, oil being supplied under slight pressure to said bearing gland 19.

It is desired to have a substantially uniform flow of foam onto the conveyor belt 11, so that the cementitious finished product will have a uniform porosity throughout. A duct 62 is therefore provided with a flange 63 which is secured by bolts 64 to the foam outlet spout 59. The lower end of duct 62 is provided with a flange 65 which is connected by bolts 66 to a feeder housing 67. The housing 67 is divided into a plurality of chambers by vertical partitions 68 so that the amount of foam delivered to different widths of the belt 11 can be varied at will. For the purpose of varying the quantity of foam delivered to each of the chambers 69 formed by partitions 68, a slide gate 70 is provided for each chamber 69, said slide gate extending between the flange 65 and the feeder housing 67. The lower portion of the feeder housing 67 is provided with a semi-cylindrical section 72 having a lower outlet port, and a star feeder 73 is rotatably mounted in said cylindrical section 72. This feeder 73 is provided with a plurality, preferably three in number, of radially extending partitions 74 leading out from a central hub 75, and is also provided with a plurality of disc-like partitions 76, each of which contacts with a registering partition 68, so as to keep separate the streams of foam delivered through chambers 69. The partitions 74 and 76 thus form a plurality of measuring compartments around the central hub 75 adapted to apportion the foam coming through the chambers 69. The star feeder 73 is secured to a shaft 77 by a key 78, or other suitable device. The shaft 77 leads outwardly through the end 79 of the casing 72, being provided with suitable bearings 80 in said case end 79. The opposite end of the shaft 77 is also rotatably supported in suitable bearings 81 in the opposite head 82 of the case 72. The shaft 77 may be continuously rotated by any suitable source of power, and for this purpose is provided with a coupling 84 which connects said shaft 77 with another power shaft 85. A pulley 86 may be provided on shaft 85, and the shaft 85 may be continuously rotated by a belt 87 engaging the pulley 86, said belt leading from a source of power such as the pulley which drives the conveyor belt 11. In view of the fact that three of the partitions or vanes 74 are provided, at one position of the star feeder in its rotation, a free passage exists from the duct 62 through the star feeder to the lower outlet duct and atmosphere. The pressure of the foam in the duct 62 thus causes the positive delivery of the foam from each partition compartment of the star feeder with a pulsating delivery of separate masses of the low density, non-fluid foam.

In operation, the foam solution enters the cylinder 5 through pipe 53, and compressed air enters said cylinder through pipe 55. The solution and air are whipped into foam by rapidly rotating rods 29 which are rotating about shaft 20, which in turn is rotated by motor 51. The foam produced passes upwardly through openings 58, again through the rods 29 to outlet spout 59, and then downwardly through duct 62. Lubricating oil for bearing gland 19 passes through pipe 61. The flow of foam to each of the chambers 69 is controlled by a slide valve 70 so that the amount of foam delivered to any width of the belt 11 can be manually controlled. Star feeder 73 rotates in the feeder casing 72 and causes the uniform delivery of foam to the belt 11 which carries the cementitious material.

Our improved foam cell is especially designed to continuously prepare and deliver, at a uniform rate, foam having a density of from two to four pounds per cubic foot. This foam is much lower in density and more stable and dry than has heretofore been produced in the art, and owing to its lower density and dryness it will not flow of its own accord. The foam is forced into the duct 62 and finally into the open chambers 69 by its cumulative pressure. It then becomes necessary to have a positive feeding device for uniformly delivering the foam in order to secure a resulting density of the plasterboard or other cementitious casts which is at all uniform. Due to the low density characteristics of the foam, the rotary star feeder 73 is particularly well adapted to cooperate with the foam cell so as to uniformly apportion and deliver the foam to the belt 11. The rotation of the feeder overcomes the tendency of the foam to adhere to the apparatus so that the foam is positively ejected from the feeder onto the belt 11 at uniform intervals.

We would state in conclusion that while the illustrated examples constitute a practical embodiment of our invention, we do not wish to limit ourselves precisely to these details, since manifestly, the same may be considerably varied without departing from the spirit of the invention as defined in the appended claims.

Having thus described our invention, we claim as new and desire to secure by Letters Patent:

1. In a foam apparatus, a cylindrical casing having an axis substantially vertical, beater elements rotatably mounted within said casing, means for introducing foam solution and compressed air into said casing to be whipped into foam, a rotary feeder and a duct to carry the foam from said casing to said rotary feeder so as to cause a uniform delivery of foam.

2. In a foam apparatus adapted for producing and delivering low density foam, a casing, a shaft rotatably mounted within said casing, means for introducing foam solution and compressed air into the lower half of said casing, beater elements within said casing and attached to said shaft adapted to whip the foam solution and compressed air into foam, a rotary feed element, a duct leading from the top of said casing into said rotary element, and measuring compartments associated with the outer periphery of said rotary element adapted to intermittently open said duct to the atmosphere and to cause a substantially uniform delivery of foam.

3. In a foam apparatus, a casing, a shaft rotatably associated within said casing, means for introducing foam solution and compressed air into said casing, beater elements within said casing adapted to whip the foam solution and compressed air into foam, a rotary feeder element a duct leading from the top of said casing to said rotary element, said feeder being adapted to intermittently open said duct to the atmosphere, separate chambers adjacent the outer periphery of said rotary element and intermediate said duct and rotary element, and means for regulating the passage of foam into said rotary element by fully or partially shutting off any of said chambers.

4. In a foam apparatus, a cylindrical casing, beater elements rotatably mounted within said casing, means for introducing foam solution and compressed air into said casing to be whipped into foam, a rotary feeder, a duct to carry the foam from said casing into said rotary feeder and adapted to cause a uniform delivery of foam therefrom, and means for rotating said feeder.

5. In a foam apparatus, a cylindrical casing, means for introducing foam solution and compressed air into said casing, a rotatably mounted shaft, beater elements within said casing associated with said rotatably mounted shaft, a lubricating chamber at the end of said shaft in such a position that the lubricant flows around the end of the shaft, and flexible packing preventing any oil from entering cylindrical casing.

6. In a foam apparatus, a cylindrical casing arranged with its axis substantially vertical, a shaft rotatably associated with said casing, a plurality of circular spiders secured to said shaft within said casing, beater elements associated with said spiders, means for introducing foam solution and compressed air into the side of said casing to be whipped into foam, a rotary feed element having measuring compartments on the outer periphery thereof for uniformly delivering said foam, and a duct leading from said casing to said rotary element, said duct being intermittently opened to the atmosphere by said feeder.

7. In a foam apparatus adapted for continuously producing and delivering low density foam, a casing, a shaft rotatably mounted in the casing, means for introducing the foaming elements into the casing, beater elements within the casing and attached to the shaft adapted to whip the foaming elements into foam, a rotary feeder element, a duct for leading the foam from said casing to said rotary element, separate chambers adjacent the outer periphery of the rotary element and intermediate said duct and rotary element for controlling the advance of said foam to said rotary element, and measuring compartments associated with the outer periphery of said rotary element and registering with said chambers, said measuring compartments being adapted to intermittently open said duct to the atmosphere and substantially uniformly deliver said foam advancing from said chambers.

8. In apparatus adapted for the production of low density foam, a casing, beater elements mounted within the casing, means for introducing the foam solution to be whipped into foam by said beater elements, a feeder, and a duct to carry the foam from the casing to the feeder so as to cause a substantially uniform delivery of foam, said feeder being adapted to intermittently open said duct to the atmosphere.

9. The method of continuously producing and substantially uniformly delivering low density foam characterized by non-flowability, which comprises introducing suitable foaming solution into a beating device, subjecting the foam to continuous beating until it is crowded from said device by its cumulative pressure, and intermittently delivering said foam from said device.

10. The method of producing and delivering low density, substantially non-fluid foam adapted for incorporation in a plastic gypsum mixture, which comprises producing a mass of foam under pressure in a closed space by the combined whipping and aeration of a foam solution, and intermittently opening said closed space to the atmosphere to permit the expulsion of said foam under its own pressure and in a pulsating stream.

11. In a foam apparatus, a closed casing, beater elements rotatably mounted within said casing, means for introducing foam solution and compressed air into said casing to be whipped into low density, substantially non-fluid foam by said beater elements, a rotary feeder in operative connection with said casing and adapted to intermittently open said casing to the atmosphere so as to permit pulsating delivery of foam under its own pressure, and means for rotating said feeder.

FRED J. GOUGH.
BERNARD T. BALLARD.